United States Patent
Bai et al.

(10) Patent No.: US 11,926,056 B2
(45) Date of Patent: Mar. 12, 2024

(54) GAIT PLANNING METHOD AND ROBOT USING THE SAME AND COMPUTER READABLE STORAGE MEDIUM

(71) Applicant: UBTECH ROBOTICS CORP LTD, Shenzhen (CN)

(72) Inventors: Jie Bai, Shenzhen (CN); Yizhang Liu, Shenzhen (CN); Ligang Ge, Shenzhen (CN); Chunyu Chen, Shenzhen (CN); Qiuyue Luo, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 281 days.

(21) Appl. No.: 17/678,030

(22) Filed: Feb. 23, 2022

(65) Prior Publication Data
US 2022/0355479 A1 Nov. 10, 2022

Related U.S. Application Data

(63) Continuation of application No. PCT/CN2021/125047, filed on Oct. 20, 2021.

(30) Foreign Application Priority Data

Apr. 30, 2021 (CN) .......................... 202110479948.X

(51) Int. Cl.
*G06F 17/00* (2019.01)
*B25J 9/16* (2006.01)

(52) U.S. Cl.
CPC .................................. *B25J 9/1664* (2013.01)

(58) Field of Classification Search
CPC .... B25J 9/1664; G05D 1/0221; G05D 1/0223
(Continued)

(56) References Cited

U.S. PATENT DOCUMENTS 8,417,382 B2 * 4/2013 Yoshiike .............. B62D 57/032
  700/258
9,120,512 B2 * 9/2015 Shirokura ............ B25J 19/0008
(Continued)

FOREIGN PATENT DOCUMENTS

| CN | 107958221 A | 4/2018 |
| CN | 110842921 A | 2/2020 |
| CN | 112572453 A | 3/2021 |

OTHER PUBLICATIONS

Stable walking of biped robot based on center of mass trajectory control (Year: 2020).*
(Continued)

*Primary Examiner* — Ronnie M Mancho

(57) ABSTRACT

A gait planning method and a robot using the same as well as a computer readable storage medium are provided. The method includes: determining a reference leg length $l_0$ and a leg length variation range A of a robot; performing a trajectory planning on a length of at least one of the legs of the robot using; an equation including the reference leg length, the leg length variation range, and a preset recurrent excitation function of a time variable t. In this manner, the trajectory planning for the leg length of the robot during motion is performed according to the characteristics of motion scene such as robot jumping or running so that the change of the leg length of the robot is adapted to the motion process, which greatly improves the stability of the robot in the motion scene such as jumping or running.

20 Claims, 8 Drawing Sheets

Double-legs-supporting Stage    Single-leg-supporting Stage    In-the-air Stage

(58) Field of Classification Search
USPC .......................................................... 700/245
See application file for complete search history.

(56) References Cited

U.S. PATENT DOCUMENTS

| | | | | |
|---|---|---|---|---|
| 9,682,474 | B2* | 6/2017 | Kamioka | B62D 57/032 |
| 9,975,249 | B2* | 5/2018 | Herr | B25J 9/1694 |
| 10,052,062 | B2* | 8/2018 | De Sapio | A61B 5/389 |
| 10,668,624 | B2* | 6/2020 | Blankespoor | B25J 9/1628 |
| 11,203,385 | B1* | 12/2021 | Blankespoor | G05D 1/021 |
| 11,278,433 | B2* | 3/2022 | Herr | B25J 19/0008 |
| 11,491,032 | B2* | 11/2022 | Herr | G16H 40/63 |
| 11,654,569 | B2* | 5/2023 | Blankespoor | B25J 9/1628 |
| | | | | 700/254 |
| 11,654,984 | B2* | 5/2023 | Blankespoor | G05D 1/027 |
| | | | | 700/258 |
| 2019/0175365 | A1* | 6/2019 | Herr | A61F 2/68 |
| 2019/0351555 | A1* | 11/2019 | Blankespoor | B25J 9/1692 |
| 2020/0022823 | A1* | 1/2020 | Herr | B25J 9/0006 |
| 2021/0369533 | A1* | 12/2021 | Huang | A61H 3/00 |
| 2022/0355479 | A1* | 11/2022 | Bai | G05D 1/0221 |

OTHER PUBLICATIONS

ISR for PCT/CN2021/125047.
Written opinions of ISA for PCT/CN2021/125047.

\* cited by examiner

GAIT PLANNING METHOD AND ROBOT USING THE SAME AND COMPUTER READABLE STORAGE MEDIUM

CROSS REFERENCE TO RELATED APPLICATIONS

The present disclosure is a continuation-application of International Application PCT/CN2021/125047, with an international filing date of Oct. 20, 2021, which claims foreign priority of Chinese Patent Application No. 202110479948.X, filed on Apr. 30, 2021 in the State Intellectual Property Office of China, the contents of all of which are hereby incorporated by reference.

BACKGROUND

1. Technical Field

The present disclosure relates to robot technology, and particularly to a gait planning method and a robot using the same as well as a computer readable storage medium.

2. Description of Related Art

In the researches of humanoid robots, most of the existing gait planning methods are aimed at the scenarios of the walking, of a robot and can make the robot walk more stably. However, these gait planning methods h poor applicability in motion scene such as robot jumping or running, and have difficulty in guaranteeing the stability of the robot.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" and "comprising" indicate the presence of stated features, entireties, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", "third", and the like in the descriptions are only used for distinguishing, and cannot be understood as indicating or implying relative importance.

Figure 1:
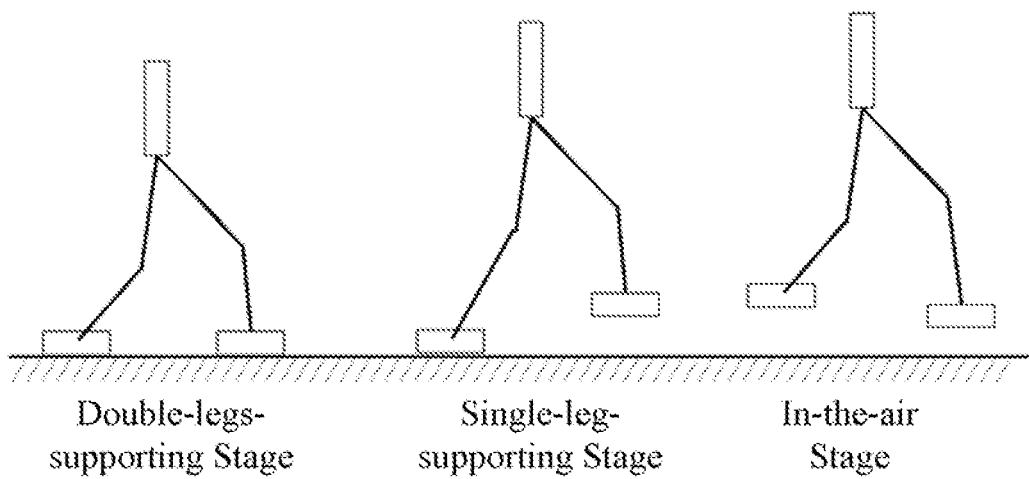
FIG. 1 is a schematic diagram of three gait stages of a robot according to an embodiment of the present disclosure.

FIG. 1 is a schematic diagram of three gait stages of a robot according to an embodiment of the present disclosure. As shown in FIG. 1, in this embodiment, the gait of the robot may be divided into three stages. In which, the robot has two legs (i.e., a left leg and a right leg), and the stage in which the both legs are in contact with the ground is the double-legs-supporting stage, the stage in which only one of the legs is in contact with the ground is the single-leg-supporting stage, and the stage in which the both legs are not in contact with the ground is the in-the-air stage.

For a stable jumping process, the gait of the robot is a cyclic switching between the double-legs-support stage and the in-the-air stage, namely: the double-legs-supporting stage→the in-the-air stage→the double-legs-supporting stage→the in-the-air stage→ . . .

For a stable running process, the gait of the robot is a cyclic switch between the single-leg-supporting stage and the in-the-air stage, and the left and right legs alternate as the support leg in each single-leg-supporting stage, that is, the single-leg-supporting stage (support leg: the left leg)→in-the-air stage→the single-leg-supporting stage (support leg: the right leg)→in-the-air stage→the single-leg-supporting stage (support leg: the left leg)→in-the-air stage→the single-leg-supporting stage (support leg: the right leg)→in-the-air stage→ . . . ; or the single-leg-supporting stage (supporting leg: the right leg)→in-the-air stage→the single-leg-supporting stage (supporting leg: the left leg)→in-the-air stage the single-leg-supporting stage (supporting leg: the right leg)→in-the-air stage the single-leg-supporting stage (supporting leg: the left leg)→in-the-air stage→ . . .

In this embodiment, the trajectory planning of the leg length(s) of the robot during movement may be performed according to the characteristics of motion scene such as the jumping or running of the robot so that the change of the leg length of the robot can be adapted to the motion process, thereby improving the stability of the robot in the motion scene such as the jumping or running of the robot.

Firstly, a reference leg length and a leg length variation range of the robot may be determined.

In which, the reference leg length may be denoted as $l_0$, the leg length variation range may be denoted as A, and the values of the two may be set according to the actual physical structure of the robot, which are not limited herein.

Then, a trajectory planning may be performed on a leg length of at least one of the legs of the robot using an equation including the reference leg length, the leg length variation range, and a preset recurrent excitation function of a time variable t.

In which, the recurrent excitation function may be denoted as f, which is changed periodically with the tune variable t and $f \in [-1, 1]$. The function may be set according to actual needs. For example, $f(_t)$=sin wt, where w is a preset circular frequency and may be set according to actual needs, hence is not limited herein. In order to facilitate the distinction, this recurrent excitation function may be denoted as a first recurrent excitation function which will make the robot slower when it starts to be in-the-air and cannot effectively move to a higher height.

Figure 2:
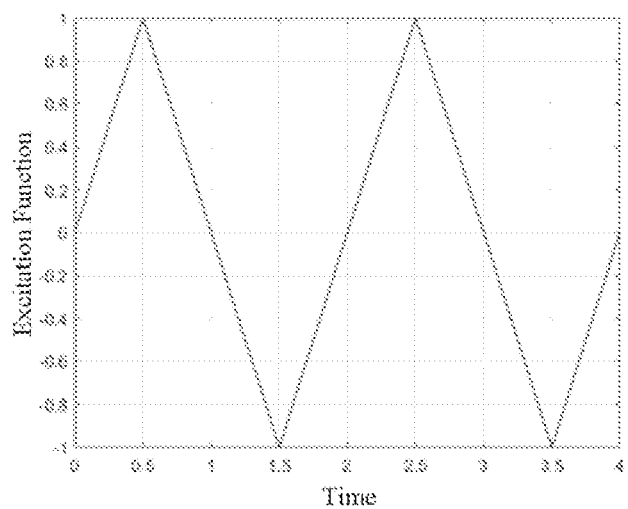
FIG. 2 is a schematic diagram of an excitation basis function according to an embodiment of the present disclosure.

FIG. 2 is a schematic diagram of an excitation basis function according to an embodiment of the present disclosure. As shown in FIG. 2, a sawtooth function with a cycle of 2 and a phase of 0 is denoted as an excitation basis function. In one embodiment, a recurrent excitation function may be constructed based on this excitation basis function using equations of:

$$f(t, \varphi) = \text{sign}(s)h(|s|);$$

$$h(x) = \frac{\tanh cx}{\tanh c}; \text{ and}$$

$$s = 2 * \text{mod}((t + \varphi)/T + 1/2, 1) - 1;$$

where, mod is a MOD function, T is a preset period, sign is a sign function, c is a preset constant, c>1.6 and its value may be set according to actual needs and is not limited herein, tanh is a hyperbolic tangent function, |s| represents the absolute value of s, and φ is a preset phase, and f(t, φ) may be abbreviated as f(t) when φ is 0. In order to facilitate the distinction, this recurrent excitation function may be denoted as a second recurrent excitation function.

Figure 3:
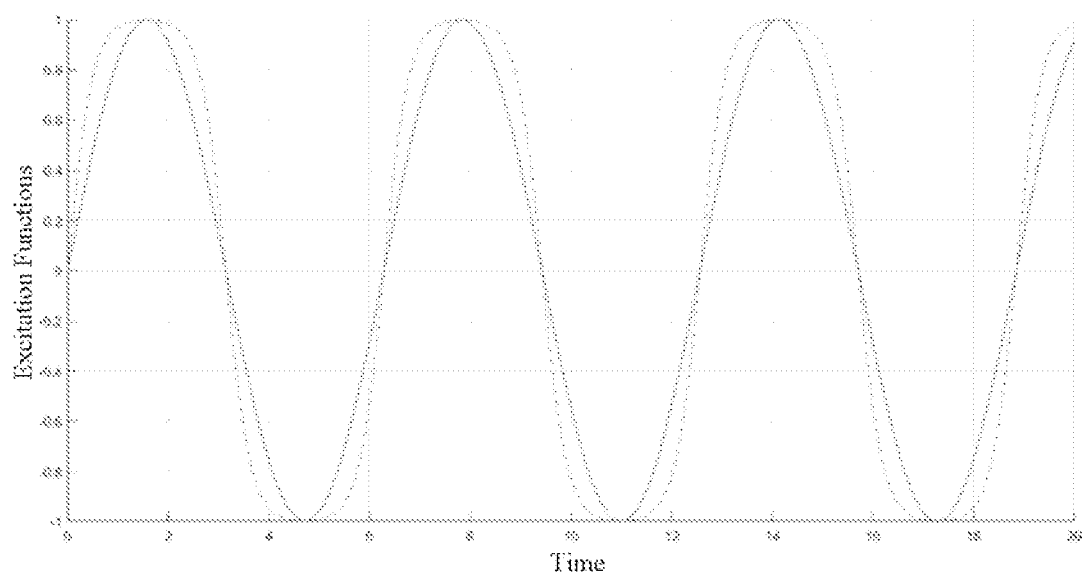
FIG. 3 is a schematic diagram of the comparison of a second recurrent excitation function and a first recurrent excitation function according to an embodiment of the present disclosure.

FIG. 3 is a schematic diagram of the comparison of a second recurrent excitation function and a first recurrent excitation function according to an embodiment of the present disclosure. As shown in FIG. 3, the first recurrent excitation function is shown in solid line, and the second recurrent excitation function is shown in dotted line. It can be seen from the figure that, in the first ¼ cycle, the value of the second recurrent excitation function is greater than that of the first recurrent excitation function, which indicates that the speed when using the second recurrent excitation function is larger. Moreover, at the peak, the change of the value the second recurrent excitation function is relatively gentle, which indicates the second recurrent excitation function is relatively stable during the in-the-air stage, and is more suitable for motion scenes such as jumping and running.

Figure 4:
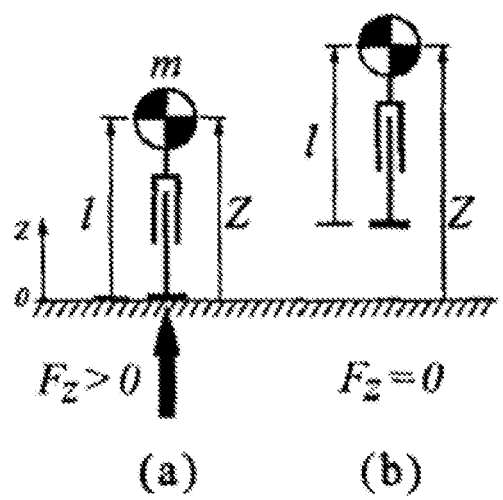
FIG. 4 is a schematic diagram of the model of a robot when performing a jumping motion according to an embodiment of the present disclosure.

FIG. 4 is a schematic diagram of the model of a robot when performing a jumping motion according to an embodiment of the present disclosure. As shown in FIG. 4 when the robot performs a jumping motion, it may be simplified to an inverted pendulum model, where m is the mass of the robot, l is the length of the both legs of the robot. During the jumping motion, the length of the left leg of the robot is the same as that of the right leg of the robot that are both l, and $F_z$ is the contact force between the robot and the ground. Part (a) of FIG. 4 shows the situation during the double-legs-supporting stage where $F_z>0$; and Part (b) of FIG. 4 shows the situation during in-the-air stage where $F_z=0$.

When the robot performs the jumping motion, the trajectory planning of the leg lengths of the both legs of the robot may be performed based on an equation of:

$$l=l_0+Af(t)$$

Figure 5:
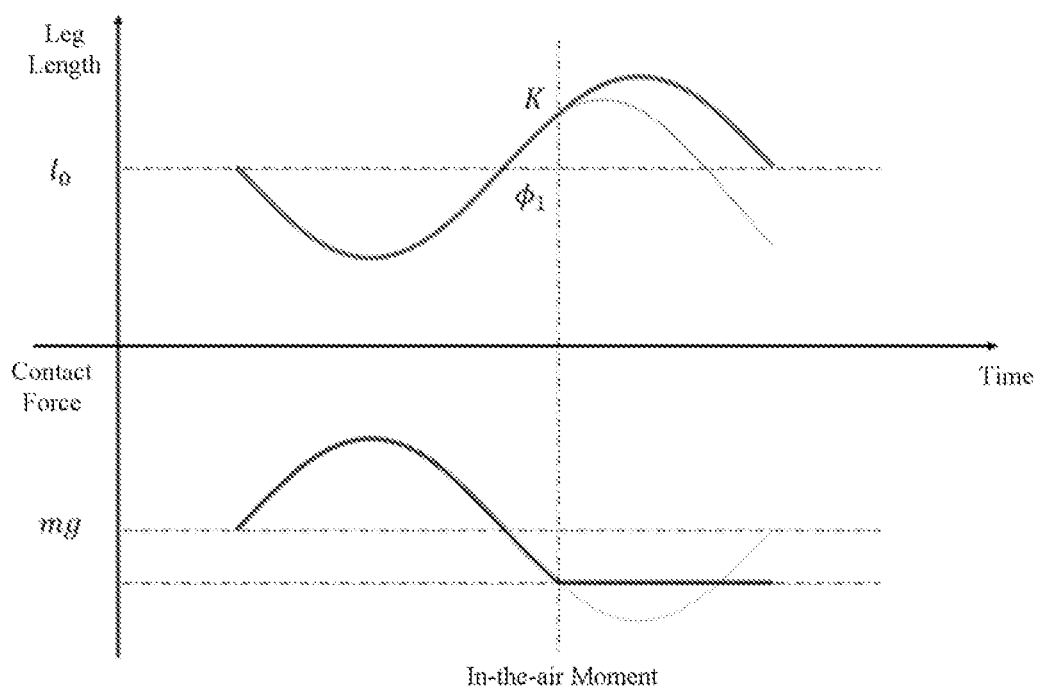
FIG. 5 is a schematic diagram of a leg length curve and a contact force curve of a robot when performing a jumping motion according to an embodiment of the present disclosure.

FIG. 5 is a schematic diagram of a leg length curve and a contact force curve of a robot when performing a jumping motion according to an embodiment of the present disclosure. As shown in FIG. 5, the result of the forgoing equation is shown by the thick line in the upper part of FIG. 5.

During the change of the length of the both legs of the robot, the contact force between the robot and the ground will also be changed as shown in an equation of:

$$f_z=m(\ddot{l}+g);$$

where, g is the acceleration of gravity.

As shown in FIG. 5, the result of the forgoing equation is shown by the thick line in the lower part of FIG. 5, where K in the figure represents the in-the-air point, and φ1 represents the phase shift at the in-the-air moment.

However, in the actual scene, considering that the contact force between the robot and the ground is always 0 during the in-the-air stage. Therefore, it may only move as shown by the thick line during the double-legs-supporting stage, and move as shown by the thin line during the that the leg length follows the parabolic movement, that is, the free fall movement of the vertical upward throw during the-air stage.

Figure 6:
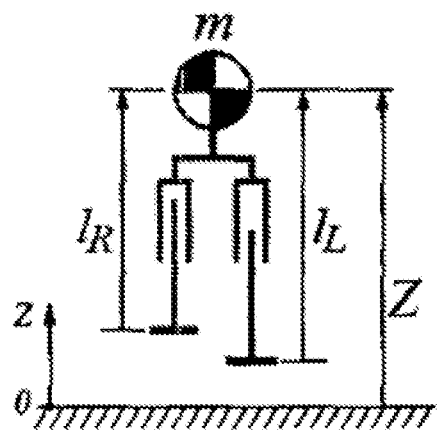
FIG. 6 is a schematic diagram of the model of a robot when performing a running motion according to an embodiment of the present disclosure.

FIG. 6 is a schematic diagram of the model of a robot when performing a running motion according to an embodiment of the present disclosure. As shown in FIG. 6, when the robot performs a running motion, it may be simplified to the model shown in the figure, where $l_L$ is the length of the left lea of the robot, and $l_R$ is the length of the right leg of the robot.

Figure 7:
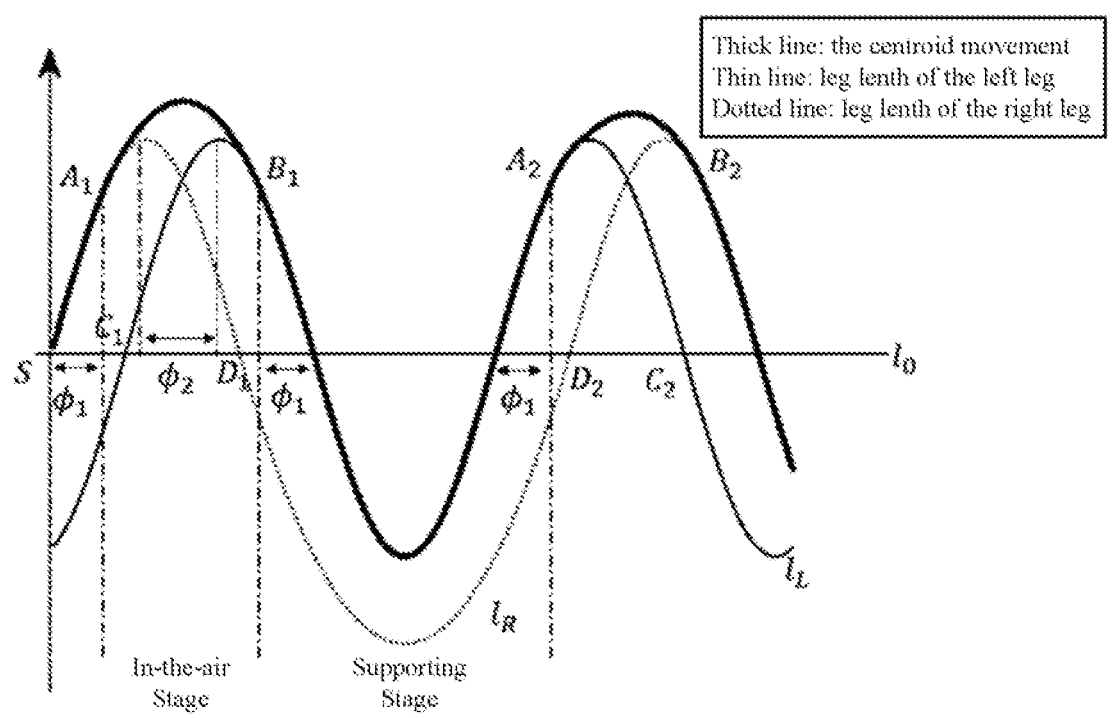
FIG. 7 is a schematic diagram of a leg length curve of a robot when performing a running motion according to an embodiment of the present disclosure.

FIG. 7 is a schematic diagram of a leg length curve of a robot when performing a running motion according to an embodiment of the present disclosure. As shown in FIG. 7, S is the starting point, $A_1$ is the in-the-air point of the right leg of the robot, $A_2$ is the in-the-air point of the left leg of the robot, $B_1$ is the landing point of the left leg of the robot, $B_2$ is the landing point of the right leg of the robot, and $C_1$ and $C_2$ are the corresponding trajectory points when the leg length of the left leg of the robot is equal to the reference leg length, and $D_1$ and $D_2$ are the corresponding trajectory points when the leg length of the right leg of the robot is equal to the reference leg length. The motion trajectory of the left leg $l_L$ is $C_1 \to B_1 \to A_2 \to C_2$, and the motion trajectory of the right leg $l_R$ is $S \to A_1 \to D_1 \to D_2 \to B_2$.

From S to $A_1$ ($S \to A_1$) is the right leg supporting stage. During this stage, the trajectory planning for the leg length of the right leg of the robot may be performed based on an equation of:

$$l_R = l_0 + Af(t).$$

Due to the free landing nature of the in-the-air stage, the duration of the in-the-air stage may be calculated based on an equation of:

$$T_{flight} = \frac{2\dot{z}_{A1}}{g};$$

where, $\dot{z}_{A1}$ vertical speed of the robot at point $A_1$, and $T_{flight}$ is the duration of the in-the-air stage.

From $B_1$ to $A_2$ ($B_1 \to A_2$) is the left leg supporting stage. During this stage, the trajectory planning for the leg length of the left leg of the robot may be performed based on an equation of:

$$l_L = l_0 + Af(t - \phi_2);$$

where, $\phi_2$ is the phase difference between the first extreme point and the second extreme point, the first extreme point is a trajectory point upon the leg length of the left leg of the robot being at the maximum value, and the second extreme point is a trajectory point upon the leg length of the right leg of the robot being at the maximum value, and meet an equation of:

$$\phi_2 + 2\left(\frac{T}{4} - \phi_1\right) = T_{flight};$$

accordingly, the duration of the supporting stage may be calculated based on an equation of:

$$T_{support} = 2\phi_1 + \frac{T}{2};$$

where, $T_{support}$ is the duration of the supporting stage.

Furthermore, the trajectory of the segment $B_1 \to A_2$ may be extended to $C_1 \to B_1 \to A_2 \to C_2$ for guaranteeing the stability of the left leg when landing on $B_1$ (i.e., the smoothness of trajectory), the trajectory of the segment $S \to A_1$ may be extended to $S \to A_1 \to D_1$ for guaranteeing the stability of the right leg when in the air on $A_1$; and the trajectory of the segment $S \to A_1 \to D_1$ may be translated to $D_2 \to B_2$ for guaranteeing the stability of the right leg when landing on $B_2$.

Based on the forgoing analysis, the trajectory planning for the leg length of the left leg of the robot may be performed based on an equation of:

$$l_L = l_0 + Af(t - \phi_2), C_1 \to B_1 \to A_2 \to C_2;$$

The trajectory planning for the leg length of the right leg of the robot may be performed based on equations of:

$$l_R = \begin{cases} l_0 + Af(t), & S \to D_1 \\ d(t), & D_1 \to D_2 \\ l_0 + Af(t, -2\phi_2), & D_2 \to B_2 \end{cases};$$

where, d is a preset interpolating function. In one embodiment, the interpolating function may be set based on an equation of:

$$d(x_0, x_1, v_0, v_1, a_0, a_1, t_0, t_1, t) = q_0 q_1 t + q_2 t^2 + q_3 t^3 + q_4 t^4 + q_5 t^5;$$

where, $x_0$, $v_0$, $a_0$, $t_0$ are the position, velocity, acceleration and time corresponding to the trajectory point $D_1$, respectively, and their values may be obtained according to the planning of the segment $S \to D_1$, $x_1$, $v_1$, $a_1$, $t_1$ are the position, velocity, acceleration and time corresponding to the trajectory point respectively, and their values may be obtained according to the planning of the segment $D_2 \to B_2$ section, and $q_0$, $q_1$, $q_2$, $q_3$, $q_4$ and $q_5$ are the undetermined coefficients of a quintic polynomial.

In order to solve each undetermined coefficient, a system of linear equations may be constructed as shown below:

$$Ax = b;$$

$$A = \begin{bmatrix} A_{11} & A_{12} \\ A_{21} & A_{22} \end{bmatrix};$$

$$A_{11} = \begin{bmatrix} t_0^5 & t_0^4 & t_0^3 \\ 5t_0^4 & 4t_0^3 & 3t_0^2 \\ 20t_0^3 & 12t_0^2 & 6t_0 \end{bmatrix}, A_{12} = \begin{bmatrix} t_0^2 & t_0 & 1 \\ 2t_0 & 1 & 0 \\ 2 & 0 & 0 \end{bmatrix};$$

$$A_{21} = \begin{bmatrix} t_1^5 & t_1^4 & t_1^3 \\ 5t_1^4 & 4t_1^3 & 3t_1^2 \\ 20t_1^3 & 12t_1^2 & 6t_1 \end{bmatrix}, A_{22} = \begin{bmatrix} t_1^2 & t_1 & 1 \\ 2t_1 & 1 & 0 \\ 2 & 0 & 0 \end{bmatrix};$$

$$x = [q_5, q_4, q_3, q_2, q_1, q_0,]^T; \text{ and}$$

$$b = [x_0, v_0, a_0, x_1, v_1, a_1]^T;$$

By solving the system of linear equations, each undetermined coefficient can be obtained, and then the trajectory planning of the leg length of the right leg in the segment $D_1 \to D_2$ can also be determined.

In summary, in this embodiment, the trajectory planning for the leg length of the robot during motion is performed according to the characteristics of motion scene such as robot jumping or running so that the change of the leg length of the robot is adapted to the motion process, which greatly improves the stability of the robot in the motion scene such as jumping or running.

It should be understood that, the sequence of the serial number of the steps in the above-mentioned embodiments does not mean the execution order while the execution order of each process should be determined by its function and internal logic, which should not be taken as any limitation to the implementation process of the embodiments.

In another embodiment, a gait planning apparatus corresponding to the gait planning method described in the forgoing embodiment may include:

a parameter determining module configured to determine a reference leg length $l_0$ and a leg length variation range A of a robot; and a leg length planning module configured to perform a trajectory planning on a leg length of at least one of the legs of the robot using an equation including the reference leg length, the leg length variation range, and a preset recurrent excitation function off time variable t.

In one embodiment, the leg length planning module may include:

a jumping double-legs planning unit configured to, during a supporting stage of a jumping motion of the robot, perform the trajectory planning on the leg length of the two legs of the robot using an equation of:

$$l=l_0+Af(t);$$

where, $l_0$ is the reference leg length, A is the lea length variation range, f is the recurrent excitation function and $f \in [-1,1]$, t is the time variable, and l is the leg length of the two legs of the robot.

In one embodiment, the leg length planning module may include:

a running left leg planning unit configured to, when the robot is running, perform the trajectory planning on the leg length of the left leg of the robot using an equation of $$l_L=l_0+Af(t,-\phi_2);$$

where, $\phi_2$ is a phase difference between a first extreme point and a second extreme point, the first extreme point is a trajectory point upon the leg length of the left leg of the robot being at the maximum value, the second extreme point is a trajectory point upon the leg length of the right leg of the robot being at the maximum value, and $l_L$ is the leg length of the left leg of the robot.

In one embodiment, the leg length planning module may include:

a running right leg planning unit configured to, when the robot is running, perform the trajectory planning on the leg length of the right leg of the robot using the equation of:

$$l_R = \begin{cases} l_0 + Af(t), S \to D_1 \\ d(t), D_1 \to D_2 \\ l_0 + Af(t, -2\phi_2), D_2 \to B_2 \end{cases};$$

where, d is a preset interpolating function, $B_2$ is a preset landing point of the right leg, $D_1$ and $D_2$. are trajectory points upon the leg length of the right leg of the robot being equal to the reference leg length, and $l_R$ is the lea length of the right leg of the robot.

In one embodiment, the leg length planning module may include:

an interpolating function setting unit configured to set the interpolating function based on an equation of:

$$d(x_0,x_1,v_0,v_1,a_0,a_1,t_0,t_1,t)=q_0+q_1t+q_2t^2+q_2t^3+q_4t^4+q_5t^5;$$

where, $x_0$, $v_0$, $a_0$, and $t_0$ are respectively a position, a velocity, an acceleration, and a time corresponding to the trajectory point $D_1$, $x_1$, $a_1$, and $t_1$ are respectively a position, a velocity, an acceleration, and a time corresponding to the trajectory point $D_2$, $q_0$, $q_1$, $q_2$, $q_3$, $q_4$ and $q_5$ are undetermined coefficients of a quintic polynomial.

In one embodiment, the leg length planning module may include:

an undetermined coefficient solving unit configured to construct a system of linear equations of:

$$Ax = b;$$

$$A = \begin{bmatrix} A_{11} & A_{12} \\ A_{21} & A_{22} \end{bmatrix};$$

$$A_{11} = \begin{bmatrix} t_0^5 & t_0^4 & t_0^3 \\ 5t_0^4 & 4t_0^3 & 3t_0^2 \\ 20t_0^3 & 12t_0^2 & 6t_0 \end{bmatrix}, A_{12} = \begin{bmatrix} t_0^2 & t_0 & 1 \\ 2t_0 & 1 & 0 \\ 2 & 0 & 0 \end{bmatrix};$$

$$A_{21} = \begin{bmatrix} t_1^5 & t_1^4 & t_1^3 \\ 5t_1^4 & 4t_1^3 & 3t_1^2 \\ 20t_1^3 & 12t_1^2 & 6t_1 \end{bmatrix}, A_{22} = \begin{bmatrix} t_1^2 & t_1 & 1 \\ 2t_1 & 1 & 0 \\ 2 & 0 & 0 \end{bmatrix};$$

$$x = [q_5, q_4, q_3, q_2, q_1, q_0,]^T; \text{ and}$$

$$b = [x_0, v_0, a_0, x_1, v_1, a_1]^T;$$

and obtain each of the undetermined coefficients of the quintic polynomial by solving the system of linear equations.

In one embodiment, the leg length planning module may include:

a recurrent excitation function setting unit configured to set the recurrent excitation function based on equations of:

$$f(t, \varphi) = \text{sign}(s)h(|s|);$$

$$h(x) = \frac{\tanh cx}{\tanh c}; \text{ and}$$

$$s = 2 * \text{mod}((t + \varphi)/T + 1/2, 1) - 1;$$

where, mod is a MOD function, T is a preset period, sign is a sign function, c is a preset constant, tanh is a hyperbolic tangent function, t is a time variable, $\phi$ is a preset phase, and represents an absolute value of s.

Those skilled in the art can clearly understand that, for the convenience and conciseness of the description, the specific working processes of the above-mentioned apparatus, modules and units can refer to the corresponding processes in the foregoing method embodiments, which will not be repeated herein.

In the above-mentioned embodiments, the description of each embodiment has its focuses, and the parts which are not described or mentioned in one embodiment may refer to the related descriptions in other embodiments.

Figure 8:
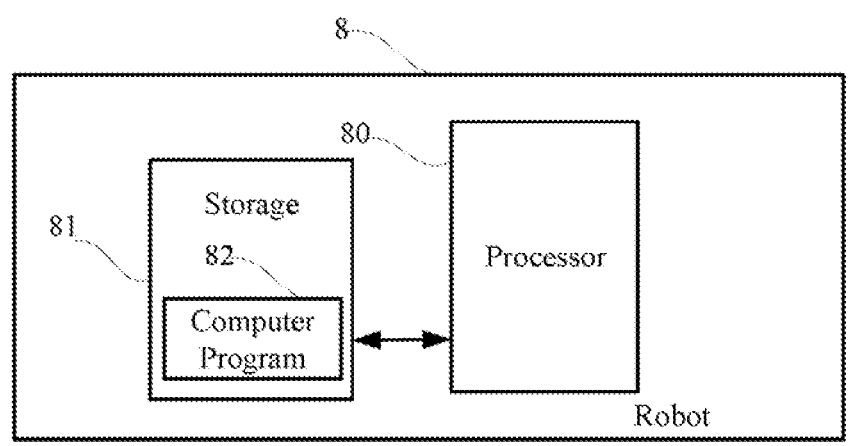
FIG. 8 is a schematic block diagram of a robot according to an embodiment of the present disclosure.

FIG. 8 is a schematic block diagram of a robot 8 according to an embodiment of the present disclosure. For convenience of description, only parts related to this embodiment are shown.

As shown in FIG. 8, in this embodiment, the robot 8 includes a processor 80, a storage 81, and a computer program 82 stored in the storage 81 and executable on the processor 80. The steps in each of the forgoing; embodiments of the gait planning method may be implemented when the processor 80 executes the computer program 82, Alternatively, the functions of the modules/units in the above-mentioned apparatus (device) embodiments may be implemented when the processor 80 executes the computer program 82.

Exemplarily, the computer program 82 may be divided into one or more modules/units, and the one or more modules 1 units are stored in the storage 81 and executed by the processor 80 to realize the present disclosure. The one or more modules/units may be a series of computer program instruction sections capable of performing a specific function, and the instruction sections are for describing the execution process of the computer program 82 in the robot 8.

It can be understood by those skilled in the art that. FIG. 8 is merely an example of the robot 8 and does not constitute a limitation on the robot 8, and may include more or fewer components than those shown in the figure, or a combination of some components or different components. For example, the robot 8 may further include an input/output device, a network access device, a bus, and the like.

The processor 80 may be a central processing unit (CPU), or be other general purpose processor, a digital signal processor (DSP), an application specific integrated circuit (ASIC), field-programmable gate array (FPGA), or be other programmable logic device, a discrete gate, a transistor logic device, and a discrete hardware component. The general purpose processor may be a microprocessor, or the processor may also be any conventional processor.

The storage 81 may be an internal storage unit of the robot 8, for example, a hard disk or a memory of the robot 8. The storage 81 may also be an external storage device if the robot 8, for example, a plug-in hard disk, a smart media card (SMC), a secure digital (SD) card, flash card, and the like, which is equipped on the robot 8. Furthermore, the storage 81 may further include both an internal storage unit and an external storage device, of the robot 8. The storage 81 is configured to store the computer program 82 and other programs and data required by the robot 8. The storage 81 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules m the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/robot and method may be implemented in other manners. For example, the above-mentioned, apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any primitive or device capable of carrying the computer program codes, a recording medium, a USB flash drive, a portable hard disk, a magnetic disk, an optical disk, a computer memory, a read-only memory (ROM) a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented gait planning method for a robot having two legs including a left leg and a right leg, comprising steps of:
   determining a reference leg length $l_0$ and a leg length variation range A of the robot;
   performing a trajectory planning on a leg length of at least one of the legs of the robot using an equation including the reference leg length, the leg length variation range, and a preset recurrent excitation function of a time variable t.

2. The method of claim 1, wherein the equation is the reference leg length $l_0$ plus the preset recurrent excitation function f multiplied by the leg length variation range A.

3. The method of claim 2, wherein the performing the trajectory planning on the leg length of at least one of the legs of the robot using the equation including the reference leg length, the leg length variation range, and the preset recurrent excitation function of the time variable t comprises:

during a supporting stage of a jumping motion of the robot, performing the trajectory planning on the leg length of the two legs of the robot using an equation of:

$$l = l_0 + Af(t)$$

where, recurrent excitation $f \in [-1,1]$, and l is the leg length of the two legs of the robot.

4. The method of claim 1, wherein the performing the trajectory planning on the leg length of at least one of the legs of the robot using the equation including the reference leg length, the leg length variation range, and the preset recurrent excitation function of the time variable t comprises:

when the robot is running, performing the trajectory planning on the leg, length of the left leg of the robot using an equation of $$l_L = l_0 + Af(t - \phi_2);$$

where, recurrent excitation $f \in [-1,1]$, $\phi_2$ is a phase difference between a first extreme point and a second extreme point, the first extreme point is a trajectory point upon the leg length of the left leg of the robot being at the maximum value, the second extreme point is a trajectory point upon the leg length of the right leg of the robot being at the maximum value, and $l_L$ is the leg length of the left leg of the robot.

5. The method of claim 1, wherein the performing the trajectory planning on the leg length of at least one of the legs of the robot using the equation including the reference leg length, the leg length variation range, and the preset recurrent excitation function of the time variable t comprises:

when the robot is running, performing the trajectory planning on the leg length of the right leg of the robot using the equation of:

$$l_R = \begin{cases} l_0 + Af(t), & S \to D_1 \\ d(t), & D_1 \to D_2 \\ l_0 + Af(t, -2\phi_2), & D_2 \to B_2 \end{cases};$$

where, recurrent excitation $f \in [-1,1]$, $\phi_2$ is a phase difference between a first extreme point and a second extreme point, the first extreme point is a trajectory point upon the leg length of the left leg of the robot being at the maximum value, and the second extreme point is a trajectory point upon the leg length of the right leg of the robot being at the maximum value, d is a preset interpolating function, S is a preset starting point, $B_2$ is a preset landing point of the right leg, $D_1$ and $D_2$ are trajectory points upon the leg length of the right leg of the robot being equal to the reference leg length, and $l_R$ is the leg length of the right leg of the robot.

6. The method of claim 5, wherein the interpolating function is set based on an equation of:

$$d(x_0, x_1, v_0, v_1, a_0, a_1, t_0, t_1, t) = q_0 q_1 t + q_2 t^2 + q_3 t^3 + q_4 t^4 + q_5 t^5;$$

where, $x_0$, $v_0$, $a_0$, and $t_0$ are respectively a position, a velocity, an acceleration, and a time corresponding to the trajectory point $D_1$, $x_1$, $v_1$, $a_1$, and $t_1$ are respectively a position, a velocity, an acceleration and a time corresponding to the trajectory point $D_2$, $q_0$, $q_1$, $q_2$, $q_3$, $q_4$ and $q_5$ are undetermined coefficients of a quintic polynomial.

7. The method of claim 6, further comprising:
constructing a system of linear equations of:

$$Ax = b;$$

$$A = \begin{bmatrix} A_{11} & A_{12} \\ A_{21} & A_{22} \end{bmatrix};$$

$$A_{11} = \begin{bmatrix} t_0^5 & t_0^4 & t_0^3 \\ 5t_0^4 & 4t_0^3 & 3t_0^2 \\ 20t_0^3 & 12t_0^2 & 6t_0 \end{bmatrix}, A_{12} = \begin{bmatrix} t_0^2 & t_0 & 1 \\ 2t_0 & 1 & 0 \\ 2 & 0 & 0 \end{bmatrix};$$

$$A_{21} = \begin{bmatrix} t_1^5 & t_1^4 & t_1^3 \\ 5t_1^4 & 4t_1^3 & 3t_1^2 \\ 20t_1^3 & 12t_1^2 & 6t_1 \end{bmatrix}, A_{22} = \begin{bmatrix} t_1^2 & t_1 & 1 \\ 2t_1 & 1 & 0 \\ 2 & 0 & 0 \end{bmatrix};$$

$$x = [q_5, q_4, q_3, q_2, q_1, q_0,]^T; \text{ and}$$

$$b = [x_0, v_0, a_0, x_1, v_1, a_1]^T;$$

obtaining each of the undetermined coefficients of the quintic polynomial by solving the system of linear equations.

8. The method of claim 1, wherein the recurrent excitation function is set based on equations of:

$$f(t, \varphi) = \text{sign}(s)h(|s|);$$

$$h(x) = \frac{\tanh cx}{\tanh c}; \text{ and}$$

$$s = 2 * \text{mod}((t + \varphi)/T + 1/2, 1) - 1;$$

where, mod is a MOD function, T is a preset period, sign is a sign function, c is a preset constant, tanh is a hyperbolic tangent function, t is a time variable, φ is a preset phase, f is the recurrent excitation function, and |s| represents an absolute value of s.

9. A robot, comprising:
two legs including a left leg and a right leg
a processor;
a memory coupled to the processor; and
one or more computer programs stored in the memory and executable on the processor;
wherein, the one or more computer programs comprise:
instructions for determining a reference leg length $l_0$ and a leg length variation range A of the robot;
instructions for performing a trajectory planning on a leg length of at least one of the legs of the robot using an equation including the reference leg length, the leg length variation range, and a preset recurrent excitation function of a time variable t.

10. The robot of claim 9, wherein the equation is the reference leg length $l_0$ plus the preset recurrent excitation function f multiplied by the leg length variation range A.

11. The robot of claim 10, wherein the instructions for performing the trajectory planning on the leg length of at least one of the legs of the robot using the equation including the reference leg length, the leg length variation range, and the preset recurrent excitation function of the time variable t comprise:

instructions for, during a supporting stage of a jumping motion of the robot, performing the trajectory planning on the leg length off the two legs of the robot using an equation of:

$$l = l_0 + Af(t);$$

where, recurrent excitation $f \in [-1,1]$, and l is the leg length of the two legs of the robot.

12. The robot of claim 9, wherein the instructions for performing the trajectory planning on the leg length of at least one of the legs of the robot using the equation including the reference leg length, the leg length variation range, and the preset recurrent excitation function of the time variable t comprise:

instructions for, when the robot is running, performing the trajectory planning on the leg length of the left leg of the robot using an equation of $$l = l_0 + Af(t, -\phi_2);$$

where, recurrent excitation $f \in [-1,1]$, $\phi_2$ is a phase difference between a first extreme point and a second extreme point, the first extreme point is a trajectory point upon the leg length of the left leg of the robot being at the maximum value, the second extreme point is a trajectory point upon the leg length of the right leg of the robot being at the maximum value, and $l_L$ is the leg length of the left leg of the robot.

13. The robot of claim 9, wherein the instructions for performing the trajectory planning on the leg length of at least one of the legs of the robot using the equation including the reference leg length, the leg length variation range, and the preset recurrent excitation function of the time variable t comprise:

instructions for, when the robot is running, performing the trajectory planning on the leg length of the right leg of the robot using the equation of $$l_R = \begin{cases} l_0 + Af(t), & S \to D_1 \\ d(t), & D_1 \to D_2 \\ l_0 + Af(t, -2\phi_2), & D_2 \to B_2 \end{cases} ;$$

where, recurrent excitation $f \in [-1,1]$, $\phi_2$ is a phase difference between a first extreme point and a second extreme point, the first extreme point is a trajectory point upon the leg length of the left leg of the robot being at the maximum value, and the second extreme point is a trajectory point upon the leg length of the right leg of the robot being at the maximum value, d is a preset interpolating function, S is a preset starting point, $B_2$ is a preset landing point of the right leg, $D_1$ and $D_2$ are trajectory points upon the leg length of the right leg of the robot being equal to the reference leg length, and $l_R$ is the leg length of the right leg of the robot.

14. The robot of claim 13, wherein the interpolating function is set based on an equation of:

$$d(x_0, x_1, v_0, v_1, a_0, a_1, t_0, t_1, t) = q_0 + q_1 t + q_2 t^2 + q_2 t^3 + q_4 t^4 + q_5 t^5;$$

where, $x_0$, $v_0$, $a_0$, and $t_0$ are respectively a position, a velocity, an acceleration, and a time corresponding to the trajectory point $D_1$, $x_1$, $v_1$, $a_1$, and $t_1$ are respectively a position, a velocity, an acceleration, and a time corresponding to the trajectory point $D_2$, $q_0$, $q_1$, $q_2$, $q_3$, $q_4$ and $q_5$ are undetermined coefficients of a quintic polynomial.

15. The robot of claim 14, the one or more computer programs further comprise:

instructions for constructing a system of linear equations of:

$$Ax = b;$$

$$A = \begin{bmatrix} A_{11} & A_{12} \\ A_{21} & A_{22} \end{bmatrix};$$

$$A_{11} = \begin{bmatrix} t_0^5 & t_0^4 & t_0^3 \\ 5t_0^4 & 4t_0^3 & 3t_0^2 \\ 20t_0^3 & 12t_0^2 & 6t_0 \end{bmatrix}, A_{12} = \begin{bmatrix} t_0^2 & t_0 & 1 \\ 2t_0 & 1 & 0 \\ 2 & 0 & 0 \end{bmatrix};$$

$$A_{21} = \begin{bmatrix} t_1^5 & t_1^4 & t_1^3 \\ 5t_1^4 & 4t_1^3 & 3t_1^2 \\ 20t_1^3 & 12t_1^2 & 6t_1 \end{bmatrix}, A_{22} = \begin{bmatrix} t_1^2 & t_1 & 1 \\ 2t_1 & 1 & 0 \\ 2 & 0 & 0 \end{bmatrix};$$

$$x = [q_5, q_4, q_3, q_2, q_1, q_0,]^T; \text{ and}$$

$$b = [x_0, v_0, a_0, x_1, v_1, a_1]^T;$$

instructions for obtaining each of the undetermined coefficients of the quintic polynomial by solving the system of linear equations.

16. The robot of claim 9, wherein the recurrent excitation function is set based on equations of:

$$f(t, \varphi) = \text{sign}(s) h(|s|);$$

$$h(x) = \frac{\tanh cx}{\tanh c}; \text{ and}$$

$$s = 2 * \text{mod}((t + \varphi)/T + 1/2, 1) - 1;$$

where, mod is a MOD function, T is a preset period, sign is a sign function, c is a preset constant, tanh is a hyperbolic tangent function, t is a time variable, φ is a preset phase, f is the recurrent excitation function, and represents an absolute value of s.

17. A non-transitory computer readable storage medium for storing one or more computer programs, wherein the one or more computer programs comprise:

instructions for determining a reference leg length $l_0$ and a leg length variation range A of a robot having two legs including a left leg and a right leg;

instructions for performing a trajectory planning on a leg length of at least one of the legs of the robot using an equation including the reference leg length, the leg length variation range, and a preset recurrent excitation function of a time variable t.

18. The storage medium of claim 17, wherein the equation is the reference leg length $l_0$ plus the preset recurrent excitation function f multiplied by the leg length variation range A.

19. The storage medium of claim 18, wherein the instructions for performing the trajectory planning on the leg length of at least one of the legs of the robot using the equation including the reference leg length, the leg length variation range, and the preset recurrent excitation function of the time variable t comprise:

instructions for, during a supporting stage of a jumping motion of the robot, performing the trajectory planning on the leg length of the two legs of the robot using an equation of:

$$l = l_0 + Af(t);$$

where, recurrent excitation $f \in [-1, 1]$, and l is the leg length of the two legs of the robot.

20. The storage medium of claim 17, wherein the instructions for performing the trajectory planning on the lea length of at least one of the leas of the robot using the equation including the reference leg length, the leg length variation range, and the preset recurrent excitation function of the tune variable t comprise:

instructions for, when the robot is running, performing the trajectory planning on the leg length of the left leg of the robot using an equation of $$l_L = l_0 + Af(t, -\phi_2)$$

where, recurrent excitation $f \in [-1, 1]$, $\phi_2$ is a phase difference between a first extreme point and a second extreme point, the first extreme point is a trajectory point upon the leg length of the left leg of the robot being at the maximum value, the second extreme point is a trajectory point upon the leg length of the right leg of the robot being at the maximum value, and $l_L$ is the leg length of the left leg of the robot.

* * * * *